Aug. 25, 1959    M. A. PAVLICK    2,901,471
CONTROL OF ISOBUTYLENE POLYMERIZATION REACTION RATE
Filed July 12, 1954
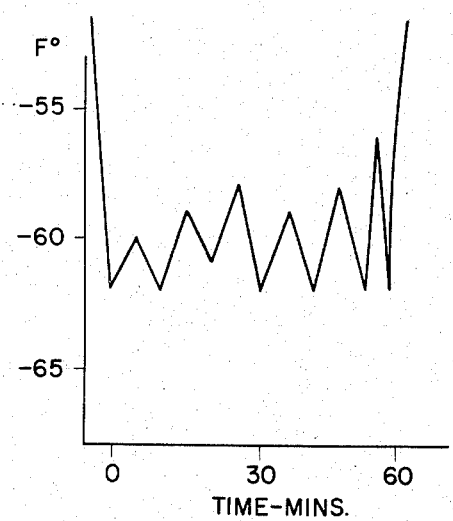
FIG. 1
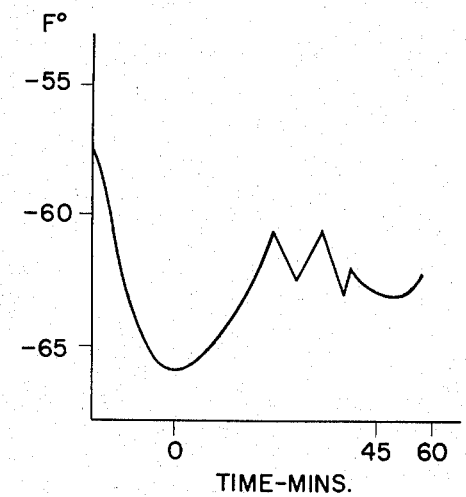
FIG. 2
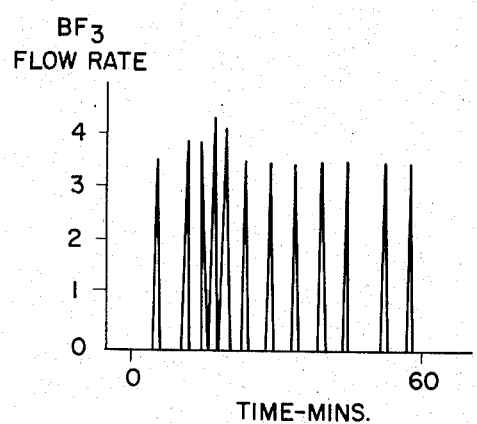
NORMAL OPERATION
FIG. 3
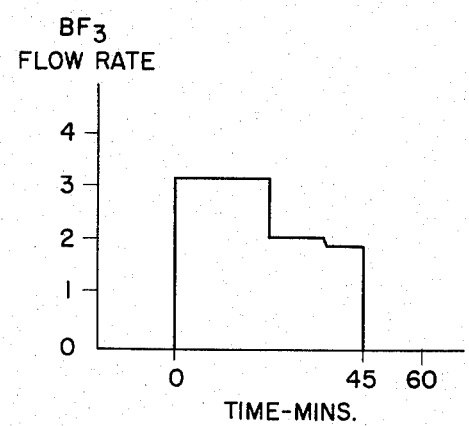
MODIFIED BY REACTION REGULATORS
FIG. 4
MICHAEL A. PAVLICK  INVENTOR
By  Attorney 2,901,471

CONTROL OF ISOBUTYLENE POLYMERIZATION REACTION RATE

Michael A. Pavlick, Passaic, N.J., assignor to Esso Research and Engineering Company, a corporation of Delaware Application July 12, 1954, Serial No. 442,813

3 Claims. (Cl. 260—94.8)

This invention relates to the polymerization of isobutylene and more specifically relates to a method for controlling the rate of reaction in such polymerizations.

It has been found possible to produce a wide range of isobutylene-containing polymers and low unsaturation polymers by a low temperature technique in which the olefinic material is cooled to a temperature below 0° C. and polymerized by the application to the cold material of boron fluoride as catalyst to yield polymers which may have Staudinger molecular weight numbers ranging from 1000 up to 500,000 or more. The molecular weight of the polymers is generally controlled by the temperature of reaction. However, the reaction is exothermic and violent and the heat released by the sudden reaction causes temperature fluctuations as much as 20–40° F. to occur. This results in unsatisfactory molecular weight control of the polymer formed. Furthermore, this lack of control over the reaction rate makes it difficult to carry out the process continuously because of the necessity of adding the catalyst intermittently allowing time between catalyst additions for the reaction mixture to be cooled to reaction temperature by the refrigerant. If $AlCl_3$ (solid) were used it would be relatively easy to control the reaction rate because physical methods of metering could be employed. However, when using $BF_3$, the injection of small quantities of catalyst together with its corrosive nature, present the difficult problem of accurately measuring the desired amount.

According to the present invention, it has now been found that the reaction rate can be satisfactorily controlled and continuous operations thereby carried out by the addition of secondary or tertiary butyl alcohol alone or with di-isobutylene to the feed.

Accordingly, the invention proposes the polymerization of isobutylene in the presence of secondary or tertiary butyl alcohol alone or with diisobutylene whereby slower heat release and diminished temperature variations are obtained when using boron fluoride as the catalyst resulting in polymer of more uniform quality and molecular weight. Other objects and details of the invention will be apparent from the following description.

In practicing the invention, an olefinic material is cooled to a low temperature, usually between 0° C. and −169° C., the preferred temperature range being from −40° C. to −110° C. The olefinic or isobutylenic material may be cooled by a refrigerating jacket upon the container or reactor, or by the direct admixture with the isobutylenic material of a suitable refrigerant. For the refrigerating jacket, any low-boiling liquid, boiling under either atmospheric pressure, vacuum or elevated pressure at the desired temperature may be used. For direct admixture, such refrigerants as liquid propane yielding a temperature of −40° C. or liquid or solid carbon dioxide yielding a temperature of −78° C. or liquid ethane yielding a temperature of −88° C. or liquid ethylene yielding a temperature of −103° C. are particularly suitable. The olefinic material may contain, in addition, a convenient diluent; such materials as the lower halogen-substituted linear-chain compounds being particularly suitable.

These diluents are particularly desirable when the reaction material is cooled by a refrigerating jacket, since the presence of the diluents reduces the amount of gel formation and improves the characteristics of the polymer. However, they may also be used in combination with an internal refrigerant, especially when the amount of internal refrigerant is relatively small, or when the heat of reaction volatilizes out most of the internal refrigerant.

For other diluent materials, ethyl and methyl chloride, ethylene dichloride, chloroform, and the like are particularly suitable. Also, carbon disulfide is highly suitable. In addition such hydrocarbon diluents as liquid ethane, liquid propane, liquid butane, liquid pentane, and the like are suitable, depending upon the polymerization temperature, since these substances may serve either as refrigerants or refrigerant diluents, or simply as diluents, depending upon the boiling point of the material and the polymerization temperature.

The polymerization mixture may consist simply of isobutylene or it may consist of isobutylene with a refrigerant or refrigerant diluent, as above pointed out. Alternatively, the polymerization mixture may contain a copolymerizable compound for which the multiolefins are particularly suitable; such substances as butadiene, isoprene, piperylene, dimethyl butadiene, myrcene and dimethallyl are particularly suitable. The boron fluoride is conveniently added by bubbling through the polymerization mixture.

The reaction proceeds promptly to yield the desired polymer. In the case of isobutylene alone, the polymer obtained may be more or less heavy, viscous oil with a Staudinger number (that is, a molecular weight according to the Staudinger method); ranging from about 1000 up to 15,000 or 18,000; or it may be a heavy, plastic sticky semi-solid with a Staudinger number between 15,000 or 18,000 to about 27,000, or it may be an elastic solid with more or less cold flow and Staudinger molecular weight values from 27,000 to 500,000 or even higher. The simple polymer of isobutylene partakes more of the character of a fully saturated aliphatic compound than it does of an olefinic compound and the iodine number is extremely low, and in the higher molecular weight polymers is so low as to be unmeasurable.

Copolymers of isobutylene and a multiolefin are rarely produced with molecular weights below about 20,000 since at lower molecular weights the characteristic reactivity with sulfur to develop an elastic limit and a substantial tensile strength does not occur; apparently because of the necessity in each molecule of the polymer of a substantial number of residual double linkages from interpolymerized multiolefin sufficient to yield several cross linkages between adjacent molecules by the curing reaction. The preferred molecular weight of the copolymer of isobutylene and a multiolefin lies within the range between about 35,000 to about 80,000, since lower molecular weights cure poorly and higher molecular weights process poorly, the polymer being too tough and leathery to be milled, extruded, calendered and otherwise processed.

In the making of such copolymerizates, the isobutylene preferably is present in major proportion and the multi-olefin present in minor proportions; the preferred ratio being from 70 parts of isobutylene with 30 parts of a multiolefin down to 99.5 parts of isobutylene with 0.5 part of the multiolefin, depending upon the ratio of copolymerization and the desired amount of unsaturation in the polymer. The resulting copolymers may have iodine numbers ranging from about 0.5 to about 50, the preferred range being from about 1 to about 20. Such copolymers show a unique reactivity with sulfur in a curing reaction to yield a definite elastic limit, a tensile strength at break, ranging from 1500 to 4000 pounds per square inch and an elongation at break ranging from 500% to 1200%, these materials being highly satisfactory substitutes for cautchouc (natural rubber).

In practicing the invention, the desired olefinic mixture is prepared and to it is added from 0.1 to 1.0%, preferably 0.2 to .5%, by volume of the secondary or tertiary butyl alcohol and 0.1 to 1.0%, preferably 0.1 to 0.6%, of diisobutylene and the polymerization is conducted as above outlined in the presence of the secondary or tertiary butyl alcohol and diisobutylene.

While it is not intended that the invention be limited to any theory of operation, it is believed that the secondary or tertiary butyl alcohol acts as the reaction rate modifier while the diisobutylene serves as the polymer chain-length determinant. The combination of the two enables the molecular weight to be controlled within fairly wide limits heretofore impossible. The use of diisobutylene as a chain-length determinant is not new but the highest molecular weight possible in commercial operation has been 16,000 to 18,000. The presence of secondary or tertiary butyl alcohol enables this to be increased to 30,000 or even higher. Likewise the use of promoters such as ethyl ether is not new. Molecular weights of 20,000 to 25,000 are obtained with such promoters but the reactions are violent and the results inconsistent. Secondary or tertiary butyl alcohol is therefore not a promoter in the usual sense, but actually serves as a rate of polymerization control.

The advantages of the invention will be better understood from a consideration of the following experimental data which are given for the sake of illustration, but without intention of limiting the invention thereto.

*Example I*

550 gallons of isobutylene are charged to an agitated vessel and refrigerated to −65° F., about −54° C., by the expansion of liquid $CO_2$ into the reactor. Boron trifluoride catalyst is added intermittently to the reactor to catalyze the polymerization reaction. The heat evolved is absorbed by further expansion of $CO_2$ refrigerant into the reactor. Due to the fast reaction and the sudden increases in temperature, the catalyst cannot be added for any long period of time and it must be discontinued while refrigeration brings the temperature back to the desired point. The molecular weight of the polymer is 13,000 to 18,000.

Figure 1 shows the amount of temperature deviation encountered and Figure 2 shows the necessary intermittent catalyst flow involved.

*Example II*

A feed blend of 550 gals. isobutylene, 2 gals. tert. $C_4H_9OH$, 1 gal. diisobutylene, was charged to the agitated vessel and refrigerated to −65° F., about −54° C., by the expansion of $CO_2$ into the reactor. Boron trifluoride catalyst was added continuously, with simultaneous refrigeration, and the reaction completed without the usual wide temperature fluctuations. The molecular weight of the polymer was 28,000. Figure 3 shows that the temperature is more uniform while Figure 4 shows that the catalyst flow rate is more nearly constant.

*Example III*

Four runs using 1000 cc. of isobutylene were carried out according to the process of Example I except that 0%, 1%, 2%, and 4% of tertiary butyl alcohol were added with no diisobutylene. The following results were obtained:

| Run | Tert. Butyl Alcohol | T,° F. | Mol. Wt. |
|---|---|---|---|
| 1 | 0 | −76° (−60° C.) | 57,990 |
| 2 | 1 | −76° (−60° C.) | 45,290 |
| 3 | 2 | −76° (−60° C.) | 60,430 |
| 4 | 4 | −76° (−60° C.) | 60,080 |

The above data show that tertiary butyl alcohol has no promotional effect when used alone. The only effect is to serve as a rate of polymerization control.

*Example IV*

1000 cc. of isobutylene was polymerized at −65° F., about −54° C., as in Example I in the presence of 1% of diethyl ether as a promoter. The polymer formed in large insoluble lumps and a definite two-phase system resulted in which large pieces of polymer were floating in unreacted monomer. In contrast to this the polymer formed in Examples II and III was produced as a homogeneous dispersion of polymer in liquor and could be handled as a single phase liquid system. This indicates that the polymer was formed slowly and was dispersed as it was formed.

The nature and objects of the present invention having been thus fully set forth and specific examples of the same given, what is claimed as new and useful and desired to be secured by Letters Patent is:

1. The polymerization process consisting of the steps in combination of mixing isobutylene and 0.1–1.0 volume percent of tertiary butyl alcohol and 0.1–1.0 volume percent of diisobutylene and polymerizing the mixture in a continuous manner at a temperature within the range between 0° C. and −164° C. in the presence of boron fluoride as catalyst.

2. The polymerization process consisting of the steps in combination of mixing isobutylene and .2–.5 volume percent of tertiary butyl alcohol and 0.1 and 0.6 volume percent of diisobutylene and polymerizing the mixture in a continuous manner at a temperature within the range between 0° C. and −164° C. by the application to the cold mixture of boron fluoride.

3. The polymerization process consisting of mixing isobutylene, 0.2 to 0.5 vol. percent of tertiary butyl alcohol, and 0.1 to 0.6 vol. percent of diisobutylene, and polymerizing the mixture in a continuous manner at about −54° C. to −60° C. by the application of boron fluoride to the cold mixture, whereby substantially uniform control is obtained of the polymerization temperature, catalyst flow rate, and polymerization rate.

References Cited in the file of this patent

UNITED STATES PATENTS 2,344,213    Otto _____ Mar. 14, 1944

OTHER REFERENCES

Evans: J. Polymer Science, vol. 4, pages 359–376 (1949).

Evans: J. Appl. Chem. June 1, 1951, pages 240–242.